(12) United States Patent
Hermann

(10) Patent No.: US 8,817,272 B2
(45) Date of Patent: Aug. 26, 2014

(54) OPTICAL POSITION-MEASURING DEVICE

(75) Inventor: Michael Hermann, Tacherting (DE)

(73) Assignee: Dr. Johnannes Heidenhein GmbH, Traunreut (DE)

( * ) Notice: Subject to any disclaimer, the term of this patent is extended or adjusted under 35 U.S.C. 154(b) by 832 days.

(21) Appl. No.: 13/061,485

(22) PCT Filed: Jul. 8, 2009

(86) PCT No.: PCT/EP2009/058667
§ 371 (c)(1),
(2), (4) Date: Feb. 28, 2011

(87) PCT Pub. No.: WO2010/023017
PCT Pub. Date: Mar. 4, 2010

(65) Prior Publication Data
US 2011/0188055 A1    Aug. 4, 2011

(30) Foreign Application Priority Data
Aug. 28, 2008  (DE) .......................... 10 2008 044 858

(51) Int. Cl.
*G01B 11/14*    (2006.01)
*G01D 5/38*     (2006.01)

(52) U.S. Cl.
CPC ....................................... *G01D 5/38* (2013.01)
USPC ......................................... 356/620; 356/614

(58) Field of Classification Search
USPC ................................................. 356/614–620
See application file for complete search history.

(56) References Cited

U.S. PATENT DOCUMENTS

| | | | |
|---|---|---|---|
| 5,428,445 A | 6/1995 | Holzapfel | |
| 5,977,539 A | 11/1999 | Holzapfel et al. | |
| 7,516,561 B2 * | 4/2009 | Holzapfel | 33/707 |

FOREIGN PATENT DOCUMENTS

| | | |
|---|---|---|
| DE | 197 48 802 | 5/1998 |
| DE | 10 2006 021 484 | 11/2007 |

(Continued)

OTHER PUBLICATIONS

International Search Report, issued in corresponding International Application No. PCT/EP2009/058667.

(Continued)

*Primary Examiner* — Tarifur Chowdhury
*Assistant Examiner* — Iyabo S Alli
(74) *Attorney, Agent, or Firm* — Kenyon & Kenyon LLP

(57) ABSTRACT

An optical position-measuring device for detecting the position of two objects movable relative to each other in at least one measuring direction includes a measuring standard which is joined to one of the two objects and possesses an incremental graduation extending in the measuring direction, as well as at least one reference marking at a reference position. The reference marking includes two reference-marking subfields disposed in mirror symmetry with respect to a reference-marking axis of symmetry, each of the subfields being made up of a structure extending in the measuring direction and having a locally changeable graduation period. In addition, the position-measuring device has a scanning unit which is joined to the other of the two objects and to which a scanning device is assigned that is used to generate at least one reference signal at the reference position. The scanning device includes at least one light source emitting divergently in the direction of the measuring standard, as well as a detector system having elements which are disposed along the measuring direction such that, starting from a central detector-system axis of symmetry in the measuring direction, the center-to-center distances between adjacent elements in the same direction change like the graduation periods of the structures in the reference-marking subfields starting from the reference-marking axis of symmetry.

15 Claims, 6 Drawing Sheets

(56) References Cited

FOREIGN PATENT DOCUMENTS

| EP | 0 513 427 | 11/1992 |
| JP | 05-133769 | 5/1993 |
| JP | 2002-048602 | 2/2002 |

OTHER PUBLICATIONS

R.M. Pettigrew, "*Analysis of Grating Imaging and its Application to Displacement Metrology*," SPIE, vol. 36, 1$^{st}$ European Congress on Optics Applied to Metrology, p. 325-332 (1977).

* cited by examiner

OPTICAL POSITION-MEASURING DEVICE

FIELD OF THE INVENTION

The present invention relates to an optical position-measuring device.

BACKGROUND INFORMATION

In European Published Patent Application No. 0 513 427, an optical position-measuring device is described which is suitable for detecting the position of two objects movable relative to each other in at least one measuring direction. To that end, the position-measuring device includes a measuring standard which is joined to one of the two objects. The measuring standard has an incremental graduation extending in the measuring direction, as well as at least one reference marking at a reference position. The reference marking is made up of a structure having a locally changeable graduation period, that is, it is formed of a structure which includes a plurality of different graduation periods. Such structures are also referred to as "chirped" graduation structures or "chirped" gratings. The position-measuring device also includes a scanning unit that is joined to the other of the two objects and has scanning devices which are used to generate at least one displacement-dependent incremental signal, as well as at least one reference signal at a reference position by the optical scanning of the incremental graduation and the reference marking along the measuring path. In so doing, a reference-pulse signal is formed when all signal frequency components, which come about due to the different chirped graduation periods of the measuring standard and of the scanning grating, are superposed in correct phase relation.

In FIG. 8 of European Published Patent Application No. 0 513 427, a special variant of a chirped reference marking formed in this manner is shown, which includes two reference-marking subfields disposed in mirror symmetry with respect to an axis of symmetry. Each of the two reference-marking subfields is made up of a structure extending in the measuring direction and having a locally changeable graduation period.

The position-measuring device described in European Published Patent Application No. 0 513 427 is based on what is referred to as an interferential scanning principle, in which the first grating in the scanning beam path is illuminated by collimated light, that is, is illuminated with a parallel-directed beam of rays. The displacement-dependent scanning signals in the form of the incremental signals and reference signals are obtained from the constructive and destructive superposition of a plurality of partial beams of rays which undergo displacement-dependent phase shifts in the case of the relative movement of the measuring standard and the scanning unit. Highly resolved position information with regard to the relative position of the two objects may be obtained in this manner.

A scanning principle for optical position-measuring devices as an alternative to this is described, for example, in the publication by R. Pettigrew having the title "Analysis of Grating Imaging and its Application to Displacement Metrology" in SPIE Vol. 36, 1st European Congress on Optics Applied to Metrology (1977), pages 325-332. Decisive in this scanning principle is the divergent, i.e., non-collimated illumination of the first grating in the scanning beam path.

German Published Patent Application No. 197 48 802 relates to chirped reference markings in optical position-measuring devices. In addition, in this publication, it is described that such reference markings may also be used in conjunction with the scanning principles indicated above, thus, in conjunction with systems which provide a divergent illumination of the first grating in the scanning beam path. However, neither German Published Patent Application No. 197 48 802 nor European Published Patent Application No. 0 513 427 gives information as to how to specifically design an optical position-measuring device with divergent illumination if chirped reference markings are to be used.

SUMMARY

Example embodiments of the present invention provide an optical position-measuring device in which a scanning principle using divergent illumination is employed, and in which chirped reference markings are able to be utilized for generating high-resolution reference signals.

The optical position-measuring device according to example embodiments of the present invention is used to detect the position of two objects movable relative to each other in at least one measuring direction. The position-measuring device has a measuring standard which is joined to one of the two objects and includes an incremental graduation extending in the measuring direction, as well as at least one reference marking at a reference position. The reference marking includes two reference-marking subfields disposed in mirror symmetry with respect to a reference-marking axis of symmetry, each of the subfields being made up of a structure extending in the measuring direction and having a locally changeable graduation period. The position-measuring device further has a scanning unit which is joined to the other of the two objects and to which a scanning device is assigned that is used to generate at least one reference signal at the reference position. The scanning device includes at least one light source emitting divergently in the direction of the measuring standard, as well as a detector system having elements which are disposed along the measuring direction such that, starting from a central detector-system axis of symmetry in the measuring direction, the center-to-center distances between adjacent elements in the same direction change like the graduation periods of the structures in the reference-marking subfields starting from the reference-marking axis of symmetry.

In this manner, the generation of a high-resolution reference-pulse signal with the aid of chirped grating structures is able to be ensured even when working with a scanning principle using divergent illumination. Moreover, in this context, it is especially advantageous that the reference-pulse generation shows little sensitivity to changes in the scanning distance between the measuring standard and the scanning unit. In addition, the generation of the reference-pulse signal when working with the position-measuring device is relatively insensitive to dirt contamination, which can be attributed to the single-field scanning used. This means that the different portions of the signal always originate from one graduation period of the reference marking scanned. In addition, the entire illuminated field of the reference marking is utilized when generating the reference-pulse signal. This is very effective, and results in large signal amplitudes, great insensitivity to disturbances, as well as little signal noise.

There are various design possibilities with regard to the optical position-measuring device.

Thus, the reference-marking subfields of the optical position-measuring device are preferably formed such that in each case, the structures have the smallest graduation periods adjacent to the reference-marking axis of symmetry, and graduation periods becoming continuously larger in each instance are provided going outwardly in the measuring direction.

In an example embodiments, the measuring-standard-side graduation frequency of the locally changing graduation periods in the two reference-marking subfields is selected as follows:

$$f_{MS}(x) := 2f_0\left(\frac{2}{L}x+1\right) \text{ for } -\frac{L}{2} \le x < 0$$

and $$f_{MS}(x) := 2f_0\left(\frac{2}{L}x-1\right) \text{ for } 0 \le x \le \frac{L}{2},$$

the following holding true for L:

$$L := \frac{n}{f_0},$$

n integer,
where:
$f_{MS}(x)$ represents the measuring-standard-side graduation frequency as a function of the position in measuring direction x;
$f_0$ represents the mean measuring-standard-side graduation frequency; and
L represents the length of the structure in the respective reference-marking subfield in measuring direction x.

In the optical position-measuring device, the elements of the detector system may be disposed with the following detector-side graduation frequencies:

$$f_{Det}(x) := \frac{2}{k}f_0\left(\frac{1}{L}x+1\right) \text{ for } -L \le x < 0$$

and $$f_{Det}(x) := \frac{2}{k}f_0\left(\frac{1}{L}x-1\right) \text{ for } 0 \le x \le L,$$

where:
$f_{Det}(x)$ represents the detector-side graduation frequency as a function of the position in measuring direction x;
$f_0$ represents mean measuring-standard-side graduation frequency;
L represents the length of the respective detector-side element arrangement in measuring direction x; and
k := 1, 2.

It is further possible to dispose the elements of the detector system along the measuring direction such that they correspond to an image, enlarged true to scale, of the structure from the reference-marking subfields.

Preferably, the extension of the light source in the measuring direction is selected as follows:

$$b_{LQ} < \frac{1}{2f_0},$$

where:
$b_{LQ}$ represents the extension of the light source in the measuring direction; and
$f_0$ represents the mean measuring-standard-side graduation frequency.

It is possible to dispose a diaphragm having a transmitting slit between the light source and the measuring standard.

In this connection, the extension of the transmitting slit in the measuring direction may be selected as follows:

$$b_{SP} < \frac{1}{2f_0},$$

where:
$b_{SP}$ represents the extension of the transmitting slit in the measuring direction; and
$f_0$ represents the mean measuring-standard-side graduation frequency.

Preferably, the reference marking and the incremental graduation take the form of phase gratings having a phase depth of 180° and a division ratio of 1:1.

Alternatively, however, it is also possible for the reference marking and the incremental graduation to be in the form of amplitude gratings or phase gratings having a phase depth of 90° and a division ratio of 1:1.

The elements of the detector system may take the form of array-detector elements of a detector array.

In this context, the detector system may include a first set of array-detector elements and a second set of array-detector elements, the array-detector elements of one set in each case being interconnected on the output side.

However, the elements of the detector system may also be in the form of graduation regions of a scanning grating, downstream of which, at least one large-area detector element is disposed.

The detector system may include two large-area detector elements, in front of which, scanning gratings formed in complementary fashion are disposed.

Further features and advantages of example embodiments of the present invention are explained in more detail below with reference to the figures.

DETAILED DESCRIPTION

Figure 1:
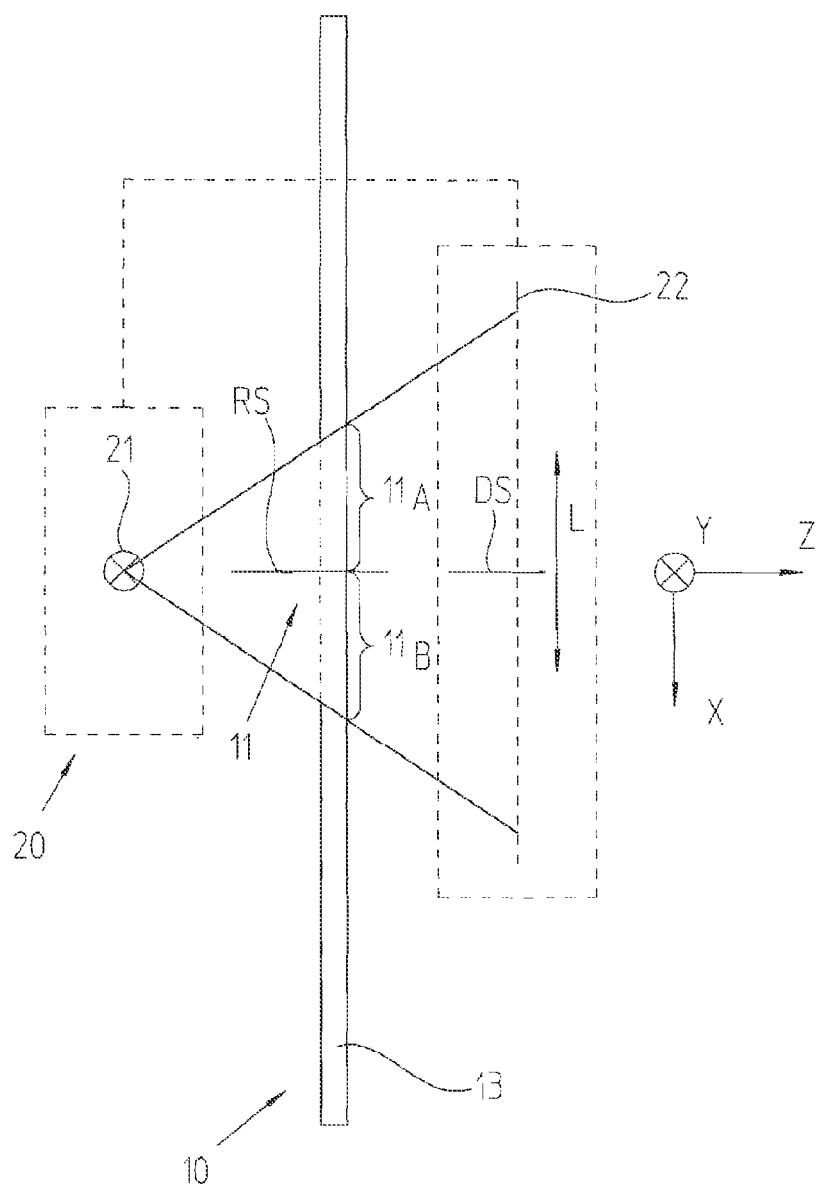
FIG. 1 shows a highly schematic representation of the scanning beam path for generating a reference-pulse signal in a position-measuring device according to an example embodiment of the present invention.
Figure 2:
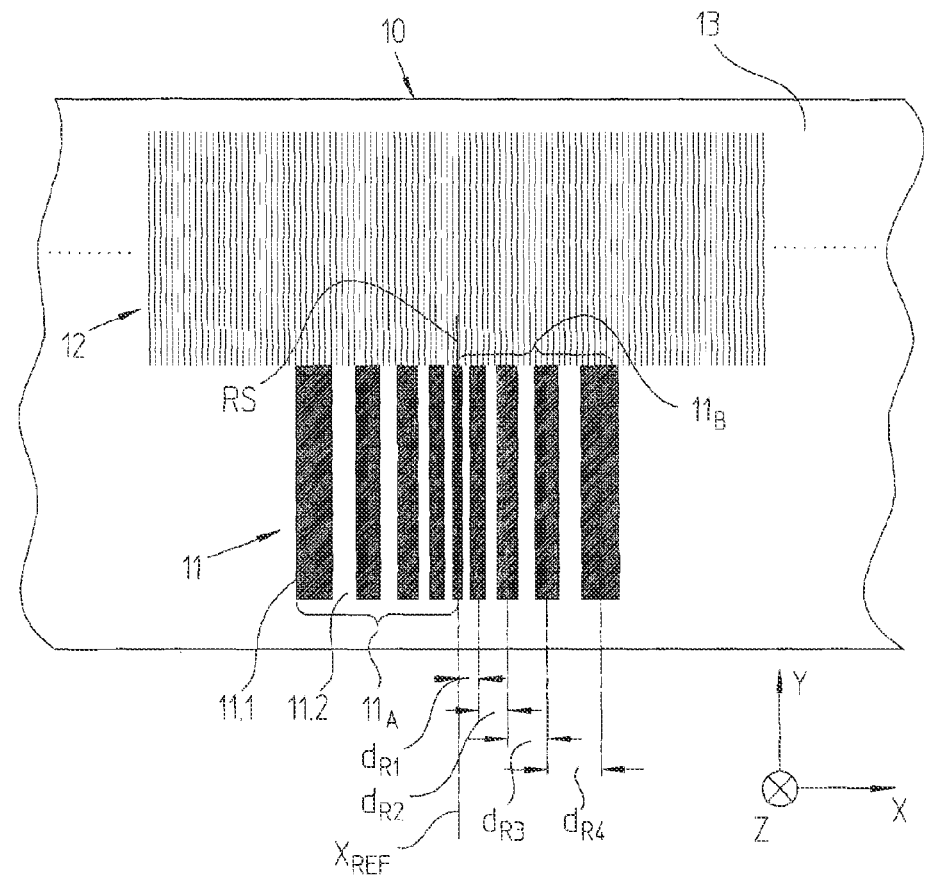
FIG. 2 shows a plan view of the measuring standard of the position-measuring device from FIG. 1 having the incremental graduation and a reference marking.
Figure 3:
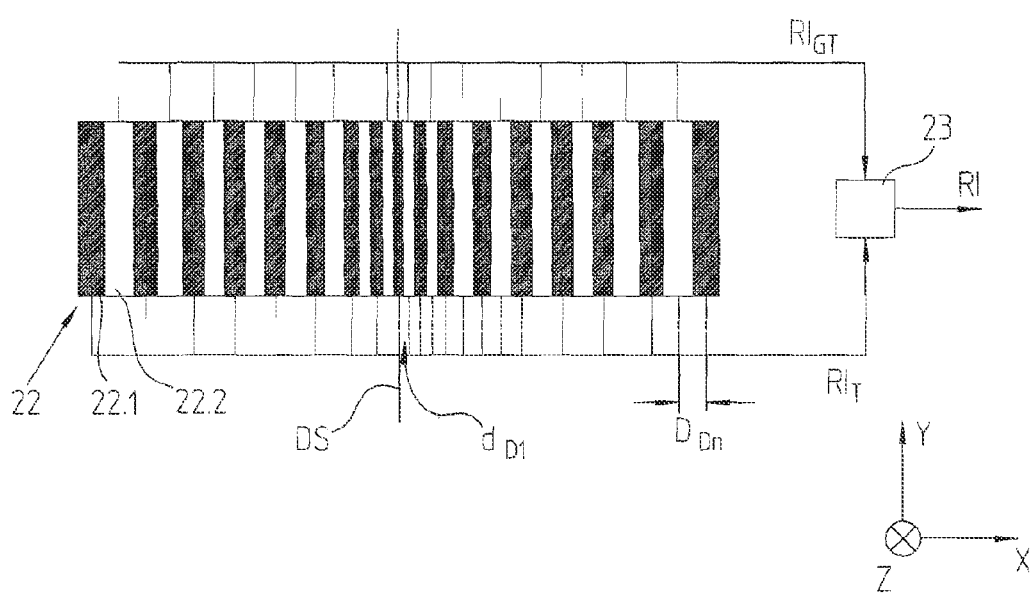
FIG. 3 shows a schematic partial view of the detection plane of the position-measuring device from FIG. 1 including an interconnection possibility for generating a reference-pulse signal.
Figure 4A:
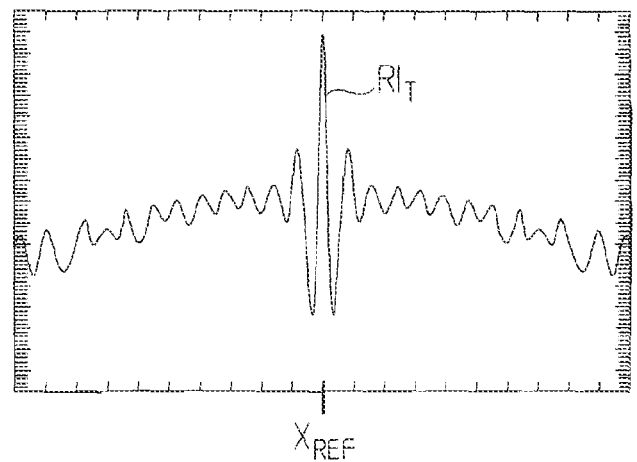
FIG. 4a shows the reference-pulse clock signal, resulting from an interconnection according to FIG. 3, in the area of the reference position.
Figure 4B:
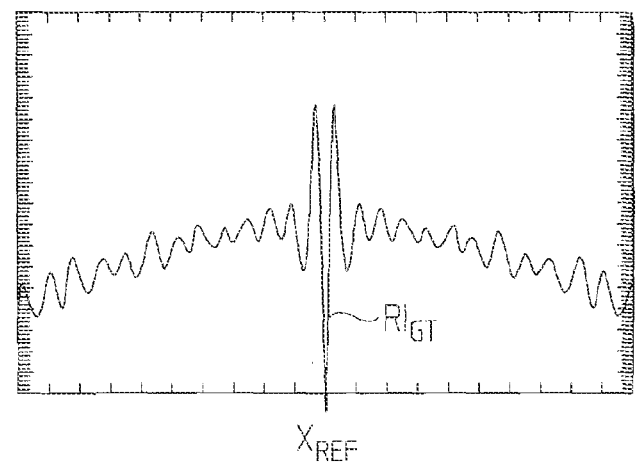
FIG. 4b shows the inverted reference-pulse clock signal, resulting from an interconnection according to FIG. 3, in the area of the reference position.
Figure 4C:
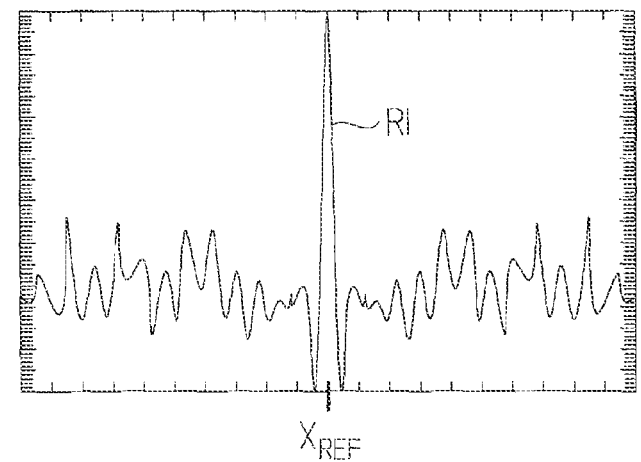
FIG. 4c shows the reference-pulse signal, resulting from an interconnection according to FIG. 3, in the area of the reference position.

In the following, an optical position-measuring device according to an example embodiment of the present invention is described in detail with reference to FIGS. 1, 2, 3, as well as 4a-4c. FIG. 1 shows, in highly schematic form, the scanning beam path for generating the reference-pulse signal; FIG. 2 shows a plan view of the measuring standard in the area of the reference marking; FIG. 3 shows a partial view of the detection plane including the interconnection for generating the reference-pulse signals; and FIGS. 4a-4c show various signal patterns in the area of the reference position.

In the exemplary embodiment shown, the optical position-measuring device takes the form of a transmitted-light linear measuring instrument and includes a scanning unit 20 which is disposed so as to be movable relative to measuring standard 10 in measuring direction x. Measuring standard 10 and scanning unit 20 are joined, for example, to two objects disposed in a manner allowing movement relative to each other in measuring direction x. For instance, they may be two machine parts movable relative to each other. A downstream control unit is able to suitably control the movement of these machine parts, e.g., in a conventional manner, based on the generated, position-dependent output signals (incremental signals, reference-pulse signals) of the optical position-measuring device.

Incidentally, the representation in FIG. 1 is highly schematic; in particular, the measuring-standard wrap-around of scanning unit 10, necessary for the transmitted-light system, is indicated merely in principle by the dotted-line connection of the parts of scanning unit 10 on the light-source side and the parts of scanning unit 10 on the detection side.

In the present example, measuring standard 10 includes a linear incremental graduation 12 that extends in measuring direction x and is located on a graduation carrier 13. Incremental graduation 12 is made up of partial areas, disposed periodically with graduation period $TP_{INC}=8$ μm in measuring direction x and having different optical properties, that extend in the y-direction in the graduation plane. In the example shown, incremental graduation 12 is in the form of a phase grating having a phase depth of 180° and a division ratio of 1:1.

Adjacent to the track having incremental graduation 12, on the part of measuring standard 10, a reference marking 11 is located at a defined reference position $x_{REF}$ on graduation carrier 13; in principle corresponding reference markings may also be placed at a plurality of reference positions. Like incremental graduation 12, reference marking 11 is in the form of a transmitted-light phase grating having a phase depth of 180°, and is made up of structures having alternating partial areas 11.1, 11.2, which produce different phase-shifting effects on the incident beams of rays.

As apparent from FIGS. 1 and 2, at reference position $x_{REF}$, reference marking 11 includes two reference-marking subfields $11_A$, $11_B$ disposed in mirror symmetry with respect to a reference-marking axis of symmetry RS. Each of the two reference-marking subfields $11_A$, $11_B$ is made up of a structure or grating-ruling structure extending in measuring direction x and having locally changing graduation periods. In the example shown, in each case, the structures have the smallest graduation periods adjacent to reference-marking axis of symmetry SR; graduation periods becoming continuously larger in each instance are provided going outwardly in measuring direction x.

In this connection, reference is made in particular to FIG. 2, in which distances $d_{Ri}$ between adjacent partial areas 11.1, 11.2 of reference marking 11 are marked in right reference-marking subfield $11_B$. As is evident, going outwardly starting from reference-marking axis of symmetry RS, it holds that:

$$d_{R1} < d_{R2} < d_{R3} < d_{R4}$$

Consequently, the structures in the two reference-marking subfields $11_A$, $11_B$ of reference marking 11 are in the form of what are referred to as chirped graduation structures, a chirp pattern in mirror symmetry with respect to reference-marking axis of symmetry RS being provided in the two reference-marking subfields $11_A$, $11_B$. Therefore, reference marking 11 possesses a symmetrically chirped structure.

For the present example, the respective chirp pattern may also be indicated specifically as measuring-standard-side graduation frequency $f_{MS}(x)$ of the locally changing graduation periods in the two reference-marking subfields $11_A$, $11_B$. Thus, variable $f_{MS}(x)$ is preferably selected as follows:

$$f_{MS}(x) := 2f_0\left(\frac{2}{L}x + 1\right) \text{ for } -\frac{L}{2} \leq x < 0 \quad \text{(equation 1.1)}$$

and $$f_{MS}(x) := 2f_0\left(\frac{2}{L}x - 1\right) \text{ for } 0 \leq x \leq \frac{L}{2}, \quad \text{(equation 1.2)}$$

the following holding true for L:

$$L := \frac{n}{f_0}, n \text{ integer,} \quad \text{(equation 1.3)}$$

where:

$f_{MS}(x)$ represents the measuring-standard-side graduation frequency as a function of the position in measuring direction x;

$f_0$ represents the mean measuring-standard-side graduation frequency; and

L represents the length of the structure in the respective reference-marking subfield in measuring direction x.

To generate the displacement-dependent output signals in the form of the periodic incremental signals and of the at least one reference-pulse signal RI at least one defined reference position $x_{REF}$, a number of components which, for the sake of simplicity, are denoted in summary as a scanning device, are located in scanning unit 20. In the present example, the scanning device needed for generating reference-pulse signal RI includes a light source 21 emitting divergently in the direction of measuring standard 10, as well as a specially designed detector system 22 adapted to reference marking 11. In this context, detector system 22 includes elements which are disposed along measuring direction x such that, starting from a central detector-system axis of symmetry DS in measuring direction x, the center-to-center distances between adjacent elements in the same direction change like the graduation periods of the structures in the two reference-marking subfields $11_A$, $11_B$ starting from reference-marking axis of symmetry RS. Consequently, just like the reference marking, detector system 22 possesses a symmetrically chirped structure with respect to the arrangement of the corresponding elements.

In the first exemplary embodiment shown, the elements of detector system 22, which are disposed in defined manner so as to be adapted to the reference marking in the detection plane, are array-detector elements 22.1, 22.2 of a detector array, as apparent from FIG. 3. Array-detector elements 22.1, 22.2 are usually in the form of photodiodes in a corresponding photodiode array, possess a rectangular shape, and are disposed so as to adjoin one another along measuring direction x. In each case, the rectangle longitudinal axis extends in a direction perpendicular to measuring direction x along the y-direction indicated in the figure.

However, as an alternative to such a design of detector system 22, it is also possible for the elements of detector system 22 to be the graduation regions of a scanning grating, downstream of which, large-area detector elements are disposed. With regard to this possibility, reference is made to the subsequent description of the fourth exemplary embodiment.

As is clear from FIG. 3, detector system 22 of the first exemplary embodiment includes a first set of array-detector elements 22.1 and a second set of array-detector elements 22.2. Array-detector elements 22.1, 22.2 of the first and second set alternate in the measuring direction. In this connection, starting from central detector-system axis of symmetry DS, center-to-center distances $d_{D1}, \ldots d_{Dn}$, of adjacent array-detector elements 22.1, 22.2 going outwardly in the same direction change like the graduation periods of the structures in the two reference-marking subfields $11_A$, $11_B$ on the part of reference marking 11. As further discernible in FIG. 3, the smallest center-to-center distances and thus the narrowest array-detector elements 22.1, 22.2 in the x-direction are provided in the immediate vicinity of detector-system axis of symmetry DS; array-detector elements 22.1, 22.2 becoming continuously wider are in each case placed going outwardly, that is, center-to-center distances $d_{Dn}$ becoming larger are provided. Therefore, according to example embodiments of the present invention, the fundamentally symmetrically chirped arrangement of the elements of detector system 22, i.e., in this case, of array-detector elements 22.1, 22.2, is adapted to the likewise symmetrically chirped arrangement of the structures of reference marking 12.

As likewise apparent from FIG. 3, all array-detector elements 22.1, 22.2 of one set are in each case interconnected on the output side. In response to the overtraveling of reference marking 11, the result from array-detector elements 22.1 of the first set is the so-called reference-pulse clock signal $RI_T$, as shown in FIG. 4a in the area of reference position $x_{REF}$. Array-detector elements 22.2 of the second set supply what is termed inverted reference-pulse clock signal $RI_{GT}$, which is shown in FIG. 4b in the area of reference position $x_{REF}$. Reference-pulse clock signal $RI_T$ and inverted reference-pulse clock signal $RI_{GT}$ are interconnected in difference via subtraction element 23. Resulting at the output of subtraction element 23 is then reference-pulse signal RI which is able to be further processed, e.g., in a conventional manner, to produce an absolute reference for the position measuring; the pattern of the reference-pulse signal thus generated in the area of reference position $x_{REF}$ is shown in FIG. 4c.

Similar to the characterization of reference-marking subfields $11_A$, $11_B$ with the aid of equations 1.1-1.3, the arrangement of the elements of detector system 22 may also be described by detector-side graduation frequencies $f_{Det}(x)$ which determine the locally changeable pattern of the center-to-center distances of the elements. Therefore, variable $f_{Det}(x)$ is preferably selected as follows:

$$f_{Det}(x) := \frac{2}{k} f_0 \left( \frac{1}{L} x + 1 \right) \text{ for } -L \leq x < 0 \quad \text{(equation 2.1)}$$

and $$f_{Det}(x) := \frac{2}{k} f_0 \left( \frac{1}{L} x - 1 \right) \text{ for } 0 \leq x \leq L, \quad \text{(equation 2.2)}$$

where:

$f_{Det}(x)$ represents the detector-side graduation frequency as a function of the position in measuring direction x;

$f_0$ represents the mean measuring-standard-side graduation frequency;

L represents the length of the respective detector-side element arrangement in measuring direction x; and $k := 1, 2$.

Variable k in equations 2.1 and 2.2 characterizes the type of optical scanning selected in each instance, particularly which orders of diffraction generated by the measuring standard contribute to the signal acquisition.

Thus, k=1 describes a system in which substantially +/−1st orders of diffraction are generated on the part of measuring standard 10, i.e., incremental graduation 12. In this case, incremental graduation 12 as well as reference marking 11 are formed as phase gratings having a phase depth of 180° and a division ratio of 1:1.

k=2 characterizes a system in which, in addition to the +/−1st orders of diffraction, a zero order of diffraction is also generated on the part of the incremental graduation of the measuring standard, and contributes to the signal acquisition. In this case, there are then specific detection planes on the detection side, in which a maximum contrast of the fringe pattern generated from the scanning of the measuring standard is present. An incremental graduation suitable for this purpose, as well as the associated reference marking are formed as amplitude gratings or else as phase gratings having a phase depth of 90° and a division ratio of 1:1.

In connection with the chirped reference marking, the division ratio mentioned in this context is to be regarded in each case as local division ratio.

Moreover, an extension $b_{LQ}$ of light source 21 in measuring direction x in the optical position-measuring device may be selected according to the following equation:

$$b_{LQ} < \frac{1}{2 f_0} \quad \text{(equation 3)}$$

where:

$b_{LQ}$ represents the extension of the light source in the measuring direction; and $f_0$ represents the mean measuring-standard-side graduation frequency In an implementation of the first example embodiment of an optical position-measuring device, the following parameters are provided:

$TP_{INC}$=8 μm (signal period=4 μm)
$f_0$=35/mm
L=1 mm
k=1

In this context, a point light source, e.g., what is referred to as a VCSEL (Vertical Cavity Surface Emitting Laser) light source is provided as light source 21.

Further example embodiments of the optical position-measuring device are explained in the following with reference to the remaining figures. In so doing, only the differences with respect to the first exemplary embodiment are discussed in each instance; otherwise, reference is made to the detailed explanation of the first example, particularly to the dimensioning rules explained in this connection, as well.

Figure 5:
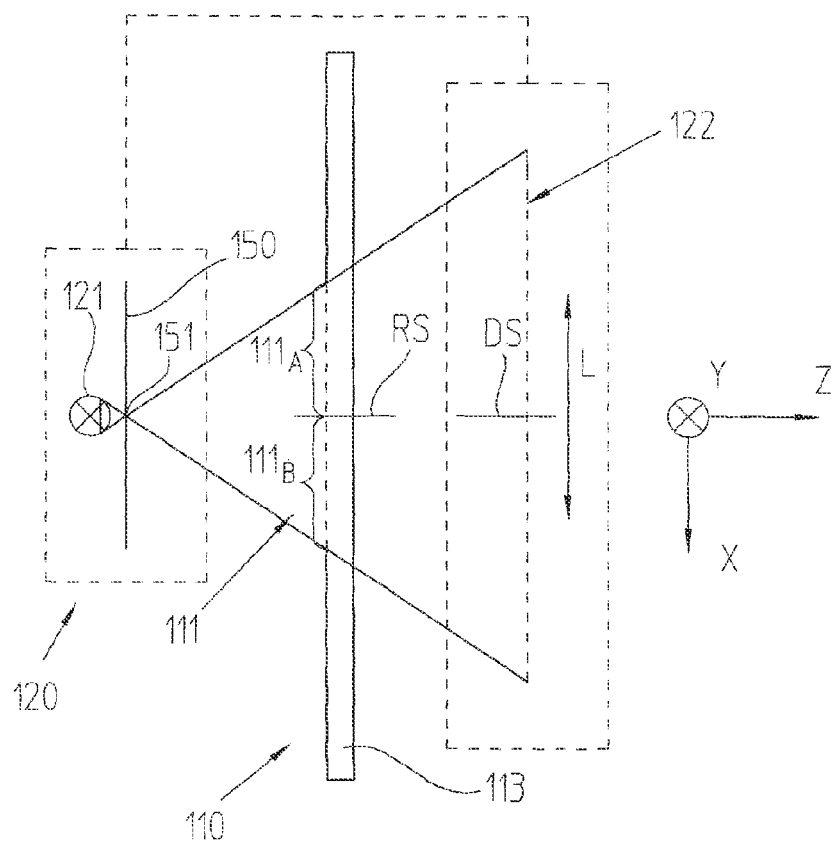
FIG. 5 shows a highly schematic representation of the scanning beam path for generating a reference-pulse signal in a position-measuring device according to an example embodiment of the present invention.
Figure 6:
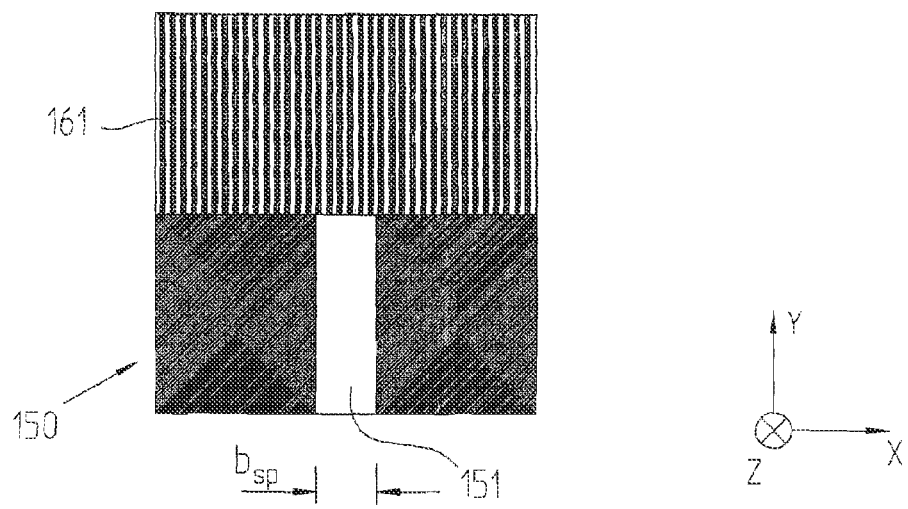
FIG. 6 shows a plan view of the gratings, provided on the transmitting side, in the position-measuring device of FIG. 5.

A second example embodiment of the optical position-measuring device is shown partially schematically in FIGS. 5 and 6. In contrast to the first example embodiment, no point light source 121 in the form of a VCSEL light source is used in scanning unit 200, but rather a spatially expanded light source 121 which, however, again emits divergently in the direction of measuring standard 110, as well. For example, an LED having an edge length of 300 μm may be utilized for this purpose. Because of the use of spatially expanded light source 121, in addition, a diaphragm 150 having a transmitting slit 151 of width b in measuring direction x is disposed between light source 121 and measuring standard 110, since the scanning principle used assumes a point light source.

With regard to extension b of transmitting slit 151 in measuring direction x, preferably the following equation (4) should be observed:

$$b_{SP} < \frac{1}{2f_0} \quad \text{(equation 4)}$$

In FIG. 5, again only those components in the scanning beam path are shown which are used to generate reference-pulse signal RI, but not all components necessary for generating the incremental signals.

FIG. 6 shows a plan view of diaphragm 150. Besides transmitting slit 151 already mentioned for generating reference-pulse signal RI, in addition, diaphragm 150 also includes a transmitting grating 161, adjacent in the y-direction, for the incremental scanning.

With regard to the generating of a reference-pulse signal RI, it is again also provided in this variant to form a reference marking 111 having symmetrically chirped structures in the two reference-marking subfields $111_A$, $111_B$ on measuring standard 110. As already in the first example, in addition to divergent light source 121, the scanning device on the part of scanning unit 120 include a detector system 122 having a symmetrically chirped arrangement of elements, e.g., array-detector elements. Reference is again made to the explanations above with regard to the specific mathematical interrelationships of the system.

In an implementation of the second example embodiment of an optical position-measuring device, the following parameters are provided:
$TP_{INC}$=8 μm (signal period=4 μm)
$f_0$=7.5/mm
L=2.133 mm
$b_{SP}$=0.048 mm
k=1

In this example embodiment, a reference-pulse signal results which is considerably wider than the signal period of the incremental signals. Therefore, it is necessary to further process the reference-pulse signal in suitable manner in order to obtain a reference-pulse signal having the width of one signal period of the incremental signals.

Figure 7:
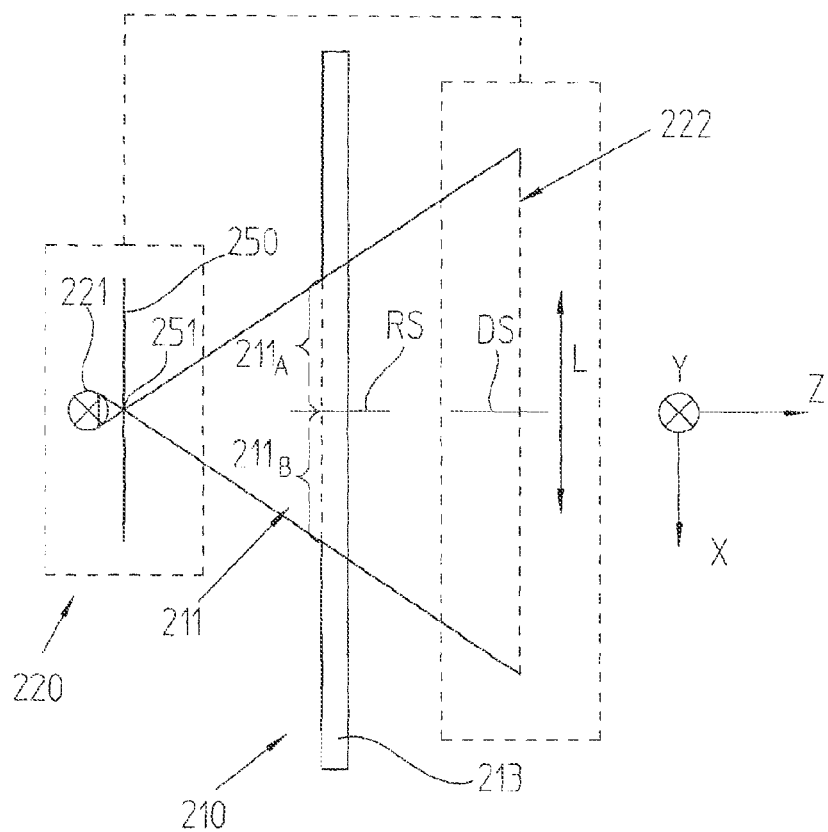
FIG. 7 shows a highly schematic representation of the scanning beam path for generating a reference-pulse signal in a position-measuring device according to an example embodiment of the present invention.
Figure 8:
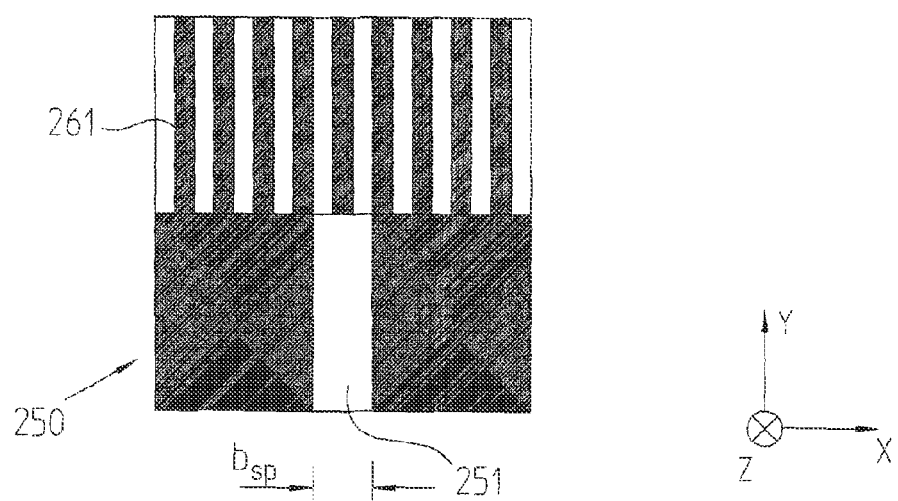
FIG. 8 shows a plan view of the gratings, provided on the transmitting side, in the position-measuring device of FIG. 7.

A further example embodiment of the optical position-measuring device is illustrated in FIGS. 7 and 8.

In contrast to the examples described up to now, in which k=1 is selected in each instance, it is provided to select the variable k=2. This means that a different measuring standard 221 is used. Thus, an incremental graduation having a markedly larger graduation period is provided; in addition to the +/−1st orders of diffraction, the generated zero order of diffraction is also used in the signal acquisition.

As in the second exemplary embodiment, the use of a spatially expanded, divergently emitting light source 221 is again provided in scanning unit 220, which is why a diaphragm 250 having a transmitting slit 251 of width $b_{SP}$ is again disposed between light source 221 and measuring standard 210.

Finally, it should be mentioned as a further special feature in this exemplary embodiment that, because of the scanning principle employed and the utilization of the zero order of diffraction, the elements of detector system 222 are disposed along measuring direction x such that they correspond to an image, enlarged true to scale, of the structures in reference-marking subfields $211_A$, $211_B$ of reference marking 211.

Reference is again made to the explanations in connection with the first exemplary embodiment with regard to the basic arrangement of the structures in reference-marking subfields $211_A$, $211_B$ and the arrangement of the elements in detector system 222.

For a practical implementation of the third example embodiment of an optical position-measuring device, the following parameters are provided:
Spatial expansion of the light source (LED): 300 μm
$TP_{INC}$=20 μm (signal period=20 μm)
$f_0$=1/mm
L=2 mm
$b_{SP}$=0.045 mm
k=2

With the selection of these parameters, a reference-pulse signal results in this example which has a width that corresponds to the incremental-signal period.

Figure 9:
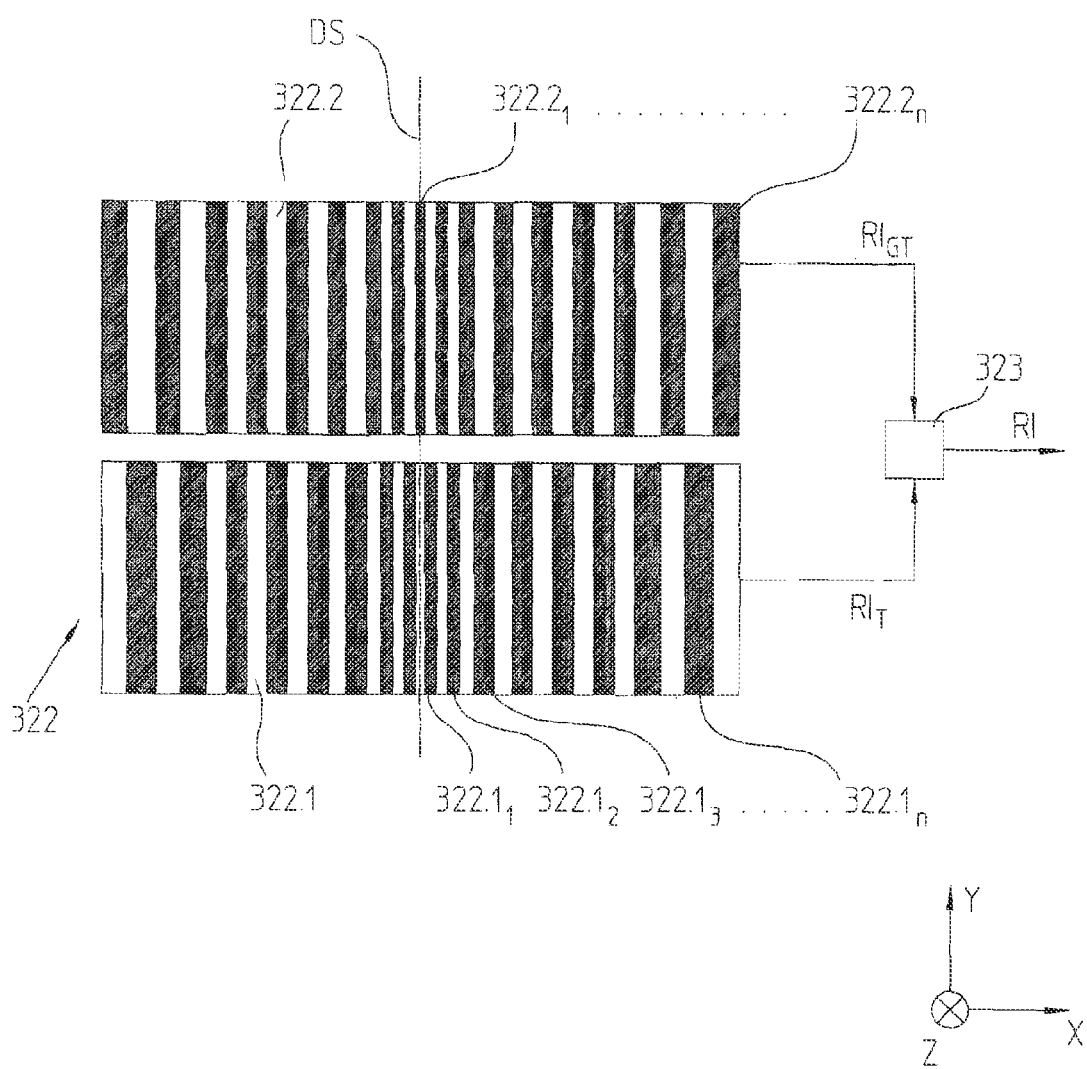
FIG. 9 shows a schematic partial view of the detection plane of a position-measuring device according to an example embodiment of the present invention.

Finally, a fourth exemplary embodiment of the optical position-measuring device is explained with reference to FIG. 9. It shows, in schematic form, a view of the detection plane in the scanning unit with an alternative variant of detector system 322.

In the three exemplary embodiments explained up to now, the elements of the detector system, disposed in correspondingly chirped fashion, were in each case in the form of array-detector elements of a suitable detector array. In the fourth exemplary embodiment, it is provided that the elements of detector system 322, disposed in correspondingly chirped fashion, are graduation regions $323.1_1 \ldots 323.1_n$ and $323.1_1 \ldots 323.1_n$, respectively, of scanning gratings, downstream of which, in each instance large-area detector elements 322.1, 322.2 are disposed. In the exemplary embodiment shown, detector system 322 includes two large-area detector elements 322.1, 322.2, each of which is rectangular, the rectangle longitudinal axis extending in measuring direction x. Because of the complementary arrangement of the scanning gratings having graduation regions $323.1_1 \ldots 323.1_n$ and $323.2_1 \ldots 323.2_n$, respectively, disposed in correspondingly chirped fashion, reference-pulse clock signal $RI_T$ is generated by detector element 322.1, and opposite-phase inverted reference-pulse clock signal $RI_{GT}$ is generated via detector element 322.2. After forming the difference between these two signals via subtraction element 323, reference signal RI results at its output.

The disposition of graduation regions $323.1_1 \ldots 323.1_n$ and $323.1_1 \ldots 323.1_n$, respectively, provided symmetrically with respect to detector-system axis of symmetry DS, corresponds for each detector element 322.1, 322.1 to the mathematical interrelationships, explained above, for the elements of the various detector systems, which were formed there in each case as array-detector elements.

For example, such a variant for the formation of detector system 322 may be considered if relatively narrow array-detector elements were to become necessary, and they are no longer technologically producible. In principle, for such detector arrays there are certain minimal widths or spacings, which cannot be undershot because of technological limits. On the other hand, it is less problematic to apply suitably finely structured scanning gratings on large-area detector elements, which function equivalently with regard to the optical scanning.

In addition to the exemplary embodiments described up to now, there are still further possibilities for the optical position-measuring device.

Thus, the position-measuring device may take the form both of a linear measuring instrument for detecting linear shifting movements, as well as a rotary position-measuring instrument for detecting rotational motions about an axis of rotation.

In addition to the transmitted-light variants described, it is possible to provide correspondingly arranged incident-light variants with scanned reflection-measuring standards.

What is claimed is:

1. An optical position-measuring device for detecting a position of two objects movable relative to each other in at least one measuring direction, comprising:
   a measuring standard joined to one of the two objects and including an incremental graduation extending in the measuring direction and at least one reference marking at a reference position, the reference marking including two reference-marking subfields arranged in mirror symmetry with respect to a reference-marking axis of symmetry, each reference-marking subfield including a structure, extending in measuring direction, having a graduation period that changes locally;
   a scanning unit joined to the other of the two objects, a scanning device assigned to the scanning unit adapted to generate at least one reference signal at the reference position, the scanning device including:
   a light source adapted to emit light divergently in a direction of the measuring standard; and
   a detector system including elements disposed along the measuring direction such that, starting from a central detector-system axis of symmetry in the measuring direction, center-to-center distances between adjacent elements in a same direction change correspondingly to the graduation periods of the structures in the reference-marking subfields starting from the reference-marking axis of symmetry.

2. The optical position-measuring device according to claim 1, wherein the reference-marking subfields are arranged such that the structures have smallest graduation periods adjacent to the reference-marking axis of symmetry, and graduation periods becoming continuously larger are provided extending outwardly in the measuring direction.

3. The optical position-measuring device according to claim 1, wherein a measuring-standard-side graduation frequency of the locally changing graduation periods in the two reference-marking subfields is provided according to:

$$f_{MS}(x) := 2f_0\left(\frac{2}{L}x+1\right) \text{ for } -\frac{L}{2} \le x < 0$$

and $$f_{MS}(x) := 2f_0\left(\frac{2}{L}x-1\right) \text{ for } 0 \le x \le \frac{L}{2},$$

the following holding true for L:

$$L := \frac{n}{f_0},$$

n being an integer;
wherein:
   $f_{MS}(x)$ represents the measuring-standard-side graduation frequency as a function of position in measuring direction x;
   $f_0$ represents a mean measuring-standard-side graduation frequency; and
   L represents a length of the structure in the respective reference-marking subfield in the measuring direction x.

4. The optical position-measuring device according to claim 1, wherein the elements of the detector system are arranged with the following detector-side graduation frequencies:

$$f_{Det}(x) := \frac{2}{k}f_0\left(\frac{1}{L}x+1\right) \text{ for } -L \le x < 0$$

and $$f_{Det}(x) := \frac{2}{k}f_0\left(\frac{1}{L}x-1\right) \text{ for } 0 \le x \le L,$$

wherein:
   $f_{Det}(x)$ represents the detector-side graduation frequency as a function of position in measuring direction x;
   $f_0$ represents a mean measuring-standard-side graduation frequency;
   L represents a length of the respective detector-side element arrangement in the measuring direction x; and
   k=1 or 2.

5. The optical position-measuring device according to claim 1, wherein the elements of the detector system are arranged along the measuring direction to correspond to an image, enlarged true to scale, of the structure of the reference-marking subfields.

6. The optical position-measuring device according to claim 1, wherein an extension of the light source in the measuring direction satisfies the following:

$$b_{LQ} < \frac{1}{2f_0},$$

wherein:
   $b_{LQ}$ represents the extension of the light source in the measuring direction; and
   $f_0$ represents a mean measuring-standard-side graduation frequency.

7. The optical position-measuring device according to claim 1, further comprising a diaphragm having a transmitting slit arranged between the light source and the measuring standard.

8. The optical position-measuring device according to claim 7, wherein an extension of the transmitting slit in the measuring direction satisfies the following:

$$b_{SP} < \frac{1}{2f_0},$$

wherein:
- $b_{SP}$ represents the extension of the transmitting slit in the measuring direction; and
- $f_0$ represents a mean measuring-standard-side graduation frequency.

9. The optical position-measuring device according to claim 1, wherein the reference marking and the incremental graduation are arranged as phase gratings having a phase depth of 180° and a division ratio of 1:1.

10. The optical position-measuring device according to claim 1, wherein the reference marking and the incremental graduation are arranged as at least one of (a) amplitude gratings and (b) phase gratings having a phase depth of 90° and a division ratio of 1:1.

11. The optical position-measuring device according to claim 1, wherein the elements of the detector system are arranged as array-detector elements of a detector array.

12. The optical position-measuring device according to claim 11, wherein the detector system includes a first set of array-detector elements and a second set of array-detector elements, the array-detector elements of each set being interconnected on an output side.

13. The optical position-measuring device according to claim 1, wherein the elements of the detector system are arranged as graduation regions of a scanning grating, at least one large-area detector element arranged downstream of the scanning grating.

14. The optical position-measuring device according to claim 1, wherein the detector system includes two large-area detector elements, scanning gratings arranged in complementary fashion arranged in front of the large-area detector elements.

15. An optical position-measuring device for detecting a position of two objects movable relative to each other in at least one measuring direction, comprising:
- a measuring standard adapted to be joined to one of the two objects and including an incremental graduation extending in the measuring direction and at least one reference marking at a reference position, the reference marking including two reference-marking subfields arranged in mirror symmetry with respect to a reference-marking axis of symmetry, each reference-marking subfield including a structure, extending in measuring direction, having a graduation period that changes locally;
- a scanning unit adapted to be joined to the other of the two objects, a scanning device assigned to the scanning unit adapted to generate at least one reference signal at the reference position, the scanning device including:
- a light source adapted to emit light divergently in a direction of the measuring standard; and
- a detector system including elements disposed along the measuring direction such that, starting from a central detector-system axis of symmetry in the measuring direction, center-to-center distances between adjacent elements in a same direction change correspondingly to the graduation periods of the structures in the reference-marking subfields starting from the reference-marking axis of symmetry.

* * * * *